United States Patent
Katsube et al.

(10) Patent No.: US 11,331,630 B2
(45) Date of Patent: May 17, 2022

(54) HOLLOW FIBER MEMBRANE MODULE

(71) Applicant: TOYOBO CO., LTD., Osaka (JP)

(72) Inventors: Mikio Katsube, Iwakuni (JP); Hideto Kotera, Iwakuni (JP); Tomohiro Okamura, Iwakuni (JP); Hidehiko Sakurai, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 105 days.

(21) Appl. No.: 16/633,395

(22) PCT Filed: Jun. 20, 2018

(86) PCT No.: PCT/JP2018/023497
§ 371 (c)(1),
(2) Date: Jan. 23, 2020

(87) PCT Pub. No.: WO2019/021701
PCT Pub. Date: Jan. 31, 2019

(65) Prior Publication Data
US 2021/0069649 A1    Mar. 11, 2021

(30) Foreign Application Priority Data

Jul. 28, 2017    (JP) .............................. JP2017-146555

(51) Int. Cl.
*B01D 63/02* (2006.01)
*B01D 63/04* (2006.01)

(52) U.S. Cl.
CPC ........... *B01D 63/04* (2013.01); *B01D 63/025* (2013.01); *B01D 2313/083* (2013.01); *B01D 2313/105* (2013.01)

(58) Field of Classification Search
CPC ........ B01D 2313/083; B01D 2313/105; B01D 2313/21; B01D 2313/44; B01D 2313/56;
(Continued)

(56) References Cited

U.S. PATENT DOCUMENTS 5,762,789 A    6/1998    de los Reyes et al.
7,150,830 B1    12/2006    Katsube et al.
(Continued)

FOREIGN PATENT DOCUMENTS

CN    1838987 A    9/2006
CN    102897872 A    1/2013
(Continued)

OTHER PUBLICATIONS

Extended European Search Report dated Mar. 11, 2021, issued in counterpart EP Application No. 18839296.3. (10 pages).
(Continued)

*Primary Examiner* — Pranav N Patel
(74) *Attorney, Agent, or Firm* — WHDA, LLP (57) ABSTRACT

A hollow fiber membrane module includes one pressure vessel, and at least one hollow fiber membrane element loaded in the pressure vessel. Each of the element includes a plurality of hollow fiber membranes each having openings at both ends, a bypass tube, and a supply port and a discharge port provided on one end side in a longitudinal direction. The supply port is in communication with inflow-side openings of hollow fiber membranes. The bypass tube is provided in the longitudinal direction of the element, has an inflow port at an end portion on a side of outflow-side openings of the hollow fiber membranes, and has an outflow port at an end portion on a side of the inflow-side openings of the hollow fiber membranes. The outflow-side openings of hollow fiber membranes are in communication with the inflow port, and the outflow port is in communication with the discharge port.

5 Claims, 7 Drawing Sheets

(58) Field of Classification Search
CPC .. B01D 2315/10; B01D 61/002; B01D 61/02; B01D 63/02; B01D 63/025; B01D 63/04; B01D 63/043; B01D 2319/04; B01D 63/12
See application file for complete search history.

(56) References Cited

U.S. PATENT DOCUMENTS

| | | | |
|---|---|---|---|
| 2004/0245174 A1 | 12/2004 | Takayama et al. | |
| 2006/0124529 A1* | 6/2006 | Schott | B01D 63/106 210/321.6 |
| 2006/0144777 A1 | 7/2006 | Kumano et al. | |
| 2006/0151375 A1 | 7/2006 | Marui et al. | |
| 2013/0213887 A1 | 8/2013 | Morikawa et al. | |
| 2016/0207000 A1* | 7/2016 | Marui | B01D 61/002 |

FOREIGN PATENT DOCUMENTS

| | | |
|---|---|---|
| CN | 103189129 A | 7/2013 |
| EP | 2213363 A1 | 8/2010 |
| JP | S60-257819 A | 12/1985 |
| JP | H07-031127 U | 6/1995 |
| JP | H10-066836 A | 3/1998 |
| JP | H11-309331 A | 11/1999 |
| JP | 2003-290633 A | 10/2003 |
| JP | 2009-268958 A | 11/2009 |
| JP | 2013-22543 A | 2/2013 |
| JP | 2013-212456 A | 10/2013 |
| JP | 2015-160157 A | 9/2015 |
| WO | 2004/069391 A1 | 8/2004 |
| WO | 2005/011850 A1 | 2/2005 |
| WO | 2015/129674 A1 | 9/2015 |

OTHER PUBLICATIONS

Office Action dated Jan. 5, 2021, issued in counterpart to JP Application No. 2017-146555, with English Translation. (16 pages).
Office Action dated Jun. 1, 2021, issued in counterpart JP Application No. 2017-146555, with English translation. (12 pages).
Office Action dated Jun. 30, 2021, issued in counterpart CN Application No. 201880049095.2, with English translation. (13 pages).
International Search Report dated Sep. 25, 2018, issued in counterpart International Application No. PCT/JP2018/023497 (1 page).

* cited by examiner

HOLLOW FIBER MEMBRANE MODULE

TECHNICAL FIELD

The present invention relates to a hollow fiber membrane module.

BACKGROUND ART

In water treatment using a membrane separation method, a membrane module including a membrane element loaded in a pressure vessel is used, the membrane element being formed by aggregating membranes into one component. In particular, a hollow fiber membrane element has a smaller water permeability per unit membrane area as compared with a spiral-type membrane element, but can achieve a large membrane area per volume of a membrane module. Thus, the hollow fiber membrane module can achieve a large water permeability as a whole, and has a very high volume efficiency and excellent compactness.

When large-amount treatment is performed using a hollow fiber membrane module including such a hollow fiber membrane element, it has been considered to use a hollow fiber membrane module arrangement group formed by arranging a plurality hollow fiber membrane modules and connecting them using tubes, as a large-sized plant (for example, PTL 1: WO2004/069391, PTL 2: Japanese Patent Laying-Open No. 2015-160157).

CITATION LIST

Patent Literature

PTL 1: WO2004/069391
PTL 2: Japanese Patent Laying-Open No. 2015-160157

SUMMARY OF INVENTION

Technical Problem

A hollow fiber membrane element used with being loaded within a hollow fiber membrane module is required to be replaced periodically with a decrease in performance. However, generally, a supply port for supplying a fluid to the inside of hollow fiber membranes is arranged at one end of the hollow fiber membrane element, and a discharge port for discharging the fluid passing through the inside of the hollow fiber membranes is arranged at an end on a side opposite to the supply port.

Accordingly, even in the case of replacing one hollow fiber membrane element, it is necessary to perform a replacement work (a work of removing pipes, taking out a used hollow fiber membrane element from a pressure vessel, loading a new hollow fiber membrane element into the pressure vessel, and connecting the pipes again) on both sides of a rack in which several tens of hollow fiber membrane modules are mounted in parallel. Therefore, an operator having performed the work on one side has to move to the other side of the rack, or the number of operators has to be increased, resulting in a large workload. In particular, for a hollow fiber membrane module at an upper portion of the rack, the replacement work is performed using a lifter or a scaffold. Thus, if it is necessary to perform the work on both sides of a hollow fiber membrane module arrangement group, it results in a significant increase in workload.

The present invention has been made in view of the aforementioned problem, and an object thereof is to provide a hollow fiber membrane module capable of improving work efficiency in the replacement of a hollow fiber membrane element and other works.

Solution to Problem (1) A hollow fiber membrane module including:
one pressure vessel; and
at least one hollow fiber membrane element loaded in the pressure vessel,
each of the at least one hollow fiber membrane element including a plurality of hollow fiber membranes each having openings at both ends, a bypass tube, and a supply port and a discharge port provided on one end side in a longitudinal direction,
the supply port being in communication with inflow-side openings of the plurality of hollow fiber membranes,
the bypass tube being provided in the longitudinal direction of the at least one hollow fiber membrane element, having a bypass tube inflow port at an end portion on a side of outflow-side openings of the hollow fiber membranes, and having a bypass tube outflow port at an end portion on a side of the inflow-side openings of the hollow fiber membranes,
the outflow-side openings of the plurality of hollow fiber membranes being in communication with the bypass tube inflow port, and the bypass tube outflow port being in communication with the discharge port.

(2) The hollow fiber membrane module according to (1), wherein the at least one hollow fiber membrane element is two hollow fiber membrane elements, and, in each of the two hollow fiber membrane elements, the supply port and the discharge port are provided on a side opposite to the other hollow fiber membrane element.

(3) The hollow fiber membrane module according to (1) or (2), wherein the hollow fiber membrane module is for isotonic solution-pressurized membrane separation.

(4) The hollow fiber membrane module according to any one of (1) to (3), wherein the at least one hollow fiber membrane element includes a hollow fiber membrane wound body having the plurality of hollow fiber membranes helically wound around a central axis.

Advantageous Effects of Invention

According to the present invention, a hollow fiber membrane module capable of improving work efficiency in the replacement of a hollow fiber membrane element and other works can be provided.

DESCRIPTION OF EMBODIMENTS

A hollow fiber membrane module of the present invention includes one pressure vessel, and at least one hollow fiber membrane element loaded in the pressure vessel.

Each of the at least one hollow fiber membrane element includes a plurality of hollow fiber membranes each having openings at both ends, a bypass tube, and a supply port and a discharge port provided on one end side in a longitudinal direction.

The supply port is in communication with inflow-side openings of the plurality of hollow fiber membranes. The bypass tube is provided in the longitudinal direction of the hollow fiber membrane element, has a bypass tube inflow port at an end portion on a side of outflow-side openings of the hollow fiber membranes, and has a bypass tube outflow port at an end portion on a side of the inflow-side openings of the hollow fiber membranes. The outflow-side openings of the plurality of hollow fiber membranes are in communication with the bypass tube inflow port, and the bypass tube outflow port is in communication with the discharge port.

Preferably, the at least one hollow fiber membrane element is two hollow fiber membrane elements, and, in each of the two hollow fiber membrane elements, the supply port and the discharge port are provided on a side opposite to the other hollow fiber membrane element.

Hereinafter, the hollow fiber membrane module of the present invention will be described with reference to the drawings. It should be noted that, in the drawings, identical or corresponding parts will be designated by the same reference characters. Further, dimensional relations in length, width, thickness, depth, and the like are changed as appropriate for clarity and simplicity of the drawings, and do not represent actual dimensional relations.

First Embodiment

Figure 1:
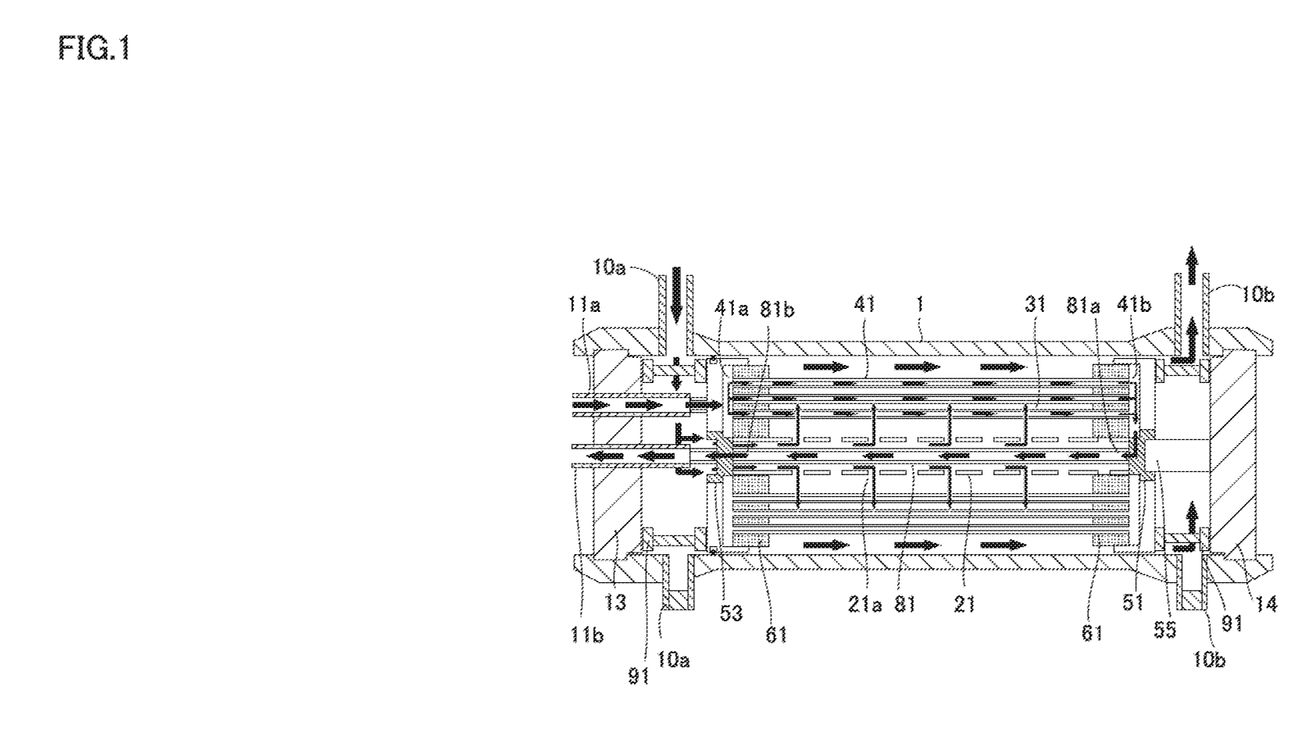
FIG. 1 is a schematic cross sectional view showing an example of a hollow fiber membrane module in a first embodiment.

Referring to FIG. 1, a hollow fiber membrane module in the present embodiment is a single element-type hollow fiber membrane module including one hollow fiber membrane element loaded in one pressure vessel 1. In FIG. 1, a feed solution (FS) flows through an outside 31 of hollow fiber membranes 41, and a draw solution (DS) flows through the inside (hollow portions) of hollow fiber membranes 41. Thereby, the DS can be diluted and the FS can be concentrated by taking out fresh water in the FS into the DS.

The hollow fiber membrane element includes a porous distribution tube 21 having a plurality of pores 21a and arranged at the center, a plurality of hollow fiber membranes 41 arranged around porous distribution tube 21, and resin walls 61 fixing porous distribution tube 21 and the plurality of hollow fiber membranes 41 at both ends thereof. It should be noted that each of the plurality of hollow fiber membranes 41 has openings at both ends thereof.

In the hollow fiber membrane element, the openings of the hollow fiber membranes are independently connected to a supply port and a discharge port. That is, the hollow fiber membrane element has a DS supply port 11a and a DS discharge port 11b which are in communication with the inside of the plurality of hollow fiber membranes 41 and the outside of the hollow fiber membrane module, and inflow-side openings 41a of hollow fiber membranes 41 are connected to DS supply port 11a and outflow-side openings 41b of hollow fiber membranes 41 are in communication with DS discharge port 11b.

It should be noted that porous distribution tube 21 is not particularly limited as long as it is a tubular body having a plurality of pores. Porous distribution tube 21 can distribute, for example, the FS supplied from an FS supply port 10a into the hollow fiber membrane module to outside 31 of the hollow fiber membranes. The pores are preferably provided radially in all directions. In addition, the porous distribution tube is preferably located at a substantially central portion of the hollow fiber membrane element.

If porous distribution tube 21 has a too large diameter, a region occupied by the hollow fiber membranes in the membrane module decreases, and as a result, a membrane area in the hollow fiber membrane element or the membrane module decreases. This may lead to a reduction in water permeability per volume. In contrast, if the porous distribution tube has a too small diameter, pressure loss increases when a supply fluid flows through the inside of the porous distribution tube, and as a result, an effective differential pressure to be applied to the hollow fiber membranes decreases. This may lead to a reduction in treatment efficiency. In addition, due to a decreased strength, the porous distribution tube may be broken by the tension of the hollow fiber membranes applied when the supply fluid flows through a hollow fiber membrane layer. It is important to set the most appropriate diameter in total consideration of these influences. The area ratio of the cross-sectional area of the porous distribution tube (except for the cross-sectional area of a bypass tube) to the cross-sectional area of the hollow fiber membrane element is preferably 4 to 20%.

A bypass tube 81 is a tube provided within the hollow fiber membrane element in a longitudinal direction thereof, has a bypass tube inflow port 81a at an end portion on a side of the outflow-side openings of the hollow fiber membranes, and has a bypass tube outflow port 81b at an end portion on a side of the inflow-side openings of the hollow fiber membranes. Bypass tube inflow port 81a is in communication with a flow channel 51a (see FIG. 5) of a distributor 51, and bypass tube outflow port 81b is in communication with an inner flow channel 53a (see FIG. 6) of a distributor 53. It should be noted that a flow channel 51c of distributor 51 is sealed by a plug 55 to prevent the fluid from passing therethrough.

It should be noted that bypass tube 81 does not have to be parallel to the longitudinal direction of the hollow fiber membrane element, and may be any tube that passes through the hollow fiber membrane element in the longitudinal direction. In addition, although bypass tube 81 is placed inside the porous distribution tube in the present embodiment, bypass tube 81 is not limited to such a configuration, and may pass through another portion within the hollow fiber membrane element.

Figure 7:
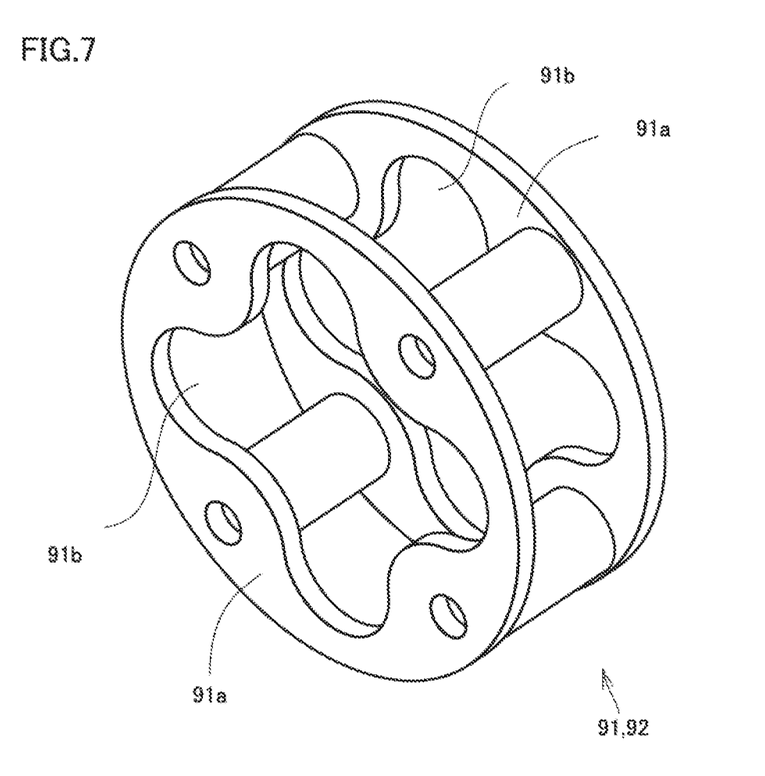
FIG. 7 is a schematic view showing a thrust pipe.

Referring to FIG. 7, a thrust pipe 91 is a structure including two disk-shaped members 91a having openings 91b, joined via four cylinders. In the hollow fiber membrane module, thrust pipe 91 is placed between the hollow fiber membrane element and each of wall members 13 and 14. Since thrust pipe 91 has openings 91b, thrust pipe 91 can fix the hollow fiber membrane element by means of two disk-shaped members 91a without interrupting the flow of the FS when it flows in from FS supply port 10a. This can prevent the hollow fiber membrane element from floating and becoming unstable within the hollow fiber membrane module when the inside of the hollow fiber membrane module is filled with the fluid.

Referring to FIG. 1, the DS supplied from DS supply port 11a flows from inflow-side openings 41a of hollow fiber membranes 41 within the hollow fiber membrane element into the inside of hollow fiber membranes 41, and flows out from outflow-side openings 41b on the other end side. The flowing-out DS flows from a flow channel 51b to flow channel 51a (see FIG. 5) of distributor 51, and flows from bypass tube inflow port 81a of bypass tube 81 into the inside of bypass tube 81. Then, the DS passes through inner flow channel 53a (see FIG. 6) of distributor 53 to which bypass tube outflow port 81b is connected, and is taken out from DS discharge port 11b to the outside.

Figure 5:
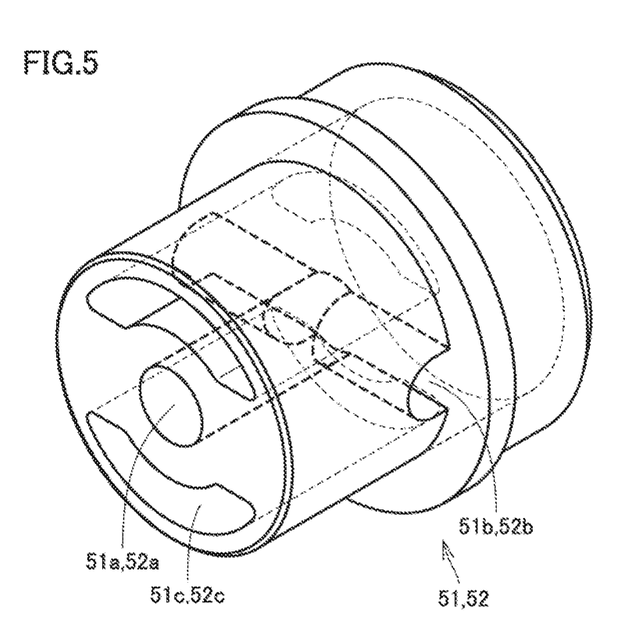
FIG. 5 is a schematic view showing a distributor.
Figure 6:
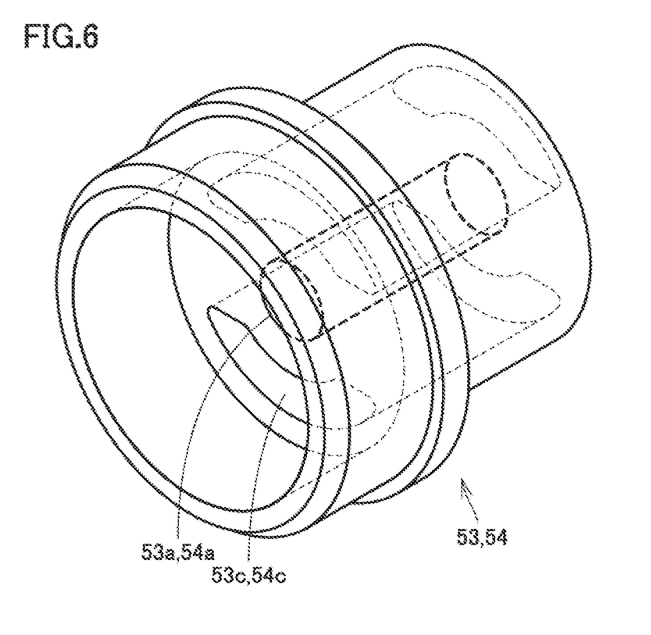
FIG. 6 is a schematic view showing another type of distributor.

Since the distributors have simple structures as shown in FIGS. 5 and 6, the hollow fiber membrane module can be fabricated at low cost and with high accuracy. Thereby, work efficiency (such as ease of attachment/detachment and assembly accuracy) in the replacement of the hollow fiber membrane element and other works can be improved.

The FS flows from FS supply port 10a, passes through an outer flow channel 53c (see FIG. 6) of distributor 53, enters a gap between porous distribution tube 21 and bypass tube 81 in the hollow fiber membrane element, flows out from pores 21a, and is supplied to outside 31 of hollow fiber membranes 41. The FS passing through outside 31 of hollow fiber membranes 41 is taken out from an FS discharge port 10b to the outside.

In the first embodiment, both DS supply port 11a and DS discharge port 11b are provided on one end side in the longitudinal direction of the hollow fiber membrane element. Thus, in the case of performing a work such as loading or replacement of the hollow fiber membrane element, it is only necessary to perform the work on one end side in a longitudinal direction of the hollow fiber membrane module (i.e., on one side of a rack in which a hollow fiber membrane module arrangement group is mounted), and thereby work efficiency can be improved.

Figure 2:
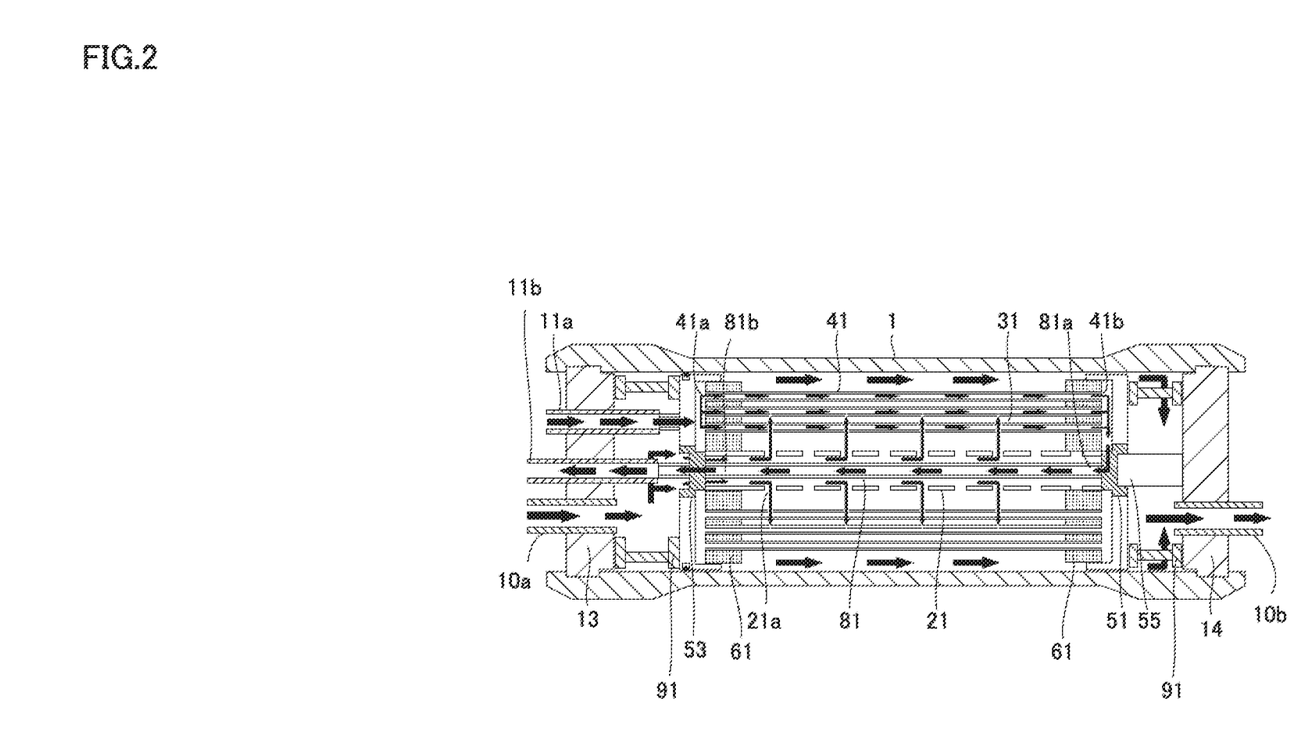
FIG. 2 is a schematic cross sectional view showing a variation of the hollow fiber membrane module in the first embodiment.

It should be noted that, although (a lower) one of FS supply ports 10a and (a lower) one of FS discharge ports 10b are closed in FIG. 1, these ports may be opened when a plurality of hollow fiber membrane modules are connected in parallel. In addition, although FS supply ports 10a and FS discharge ports 10b are provided in an outer circumferential portion of pressure vessel 1 in FIG. 1, they are not limited to such a configuration, and their configuration can be changed as appropriate. For example, as shown in FIG. 2, FS supply port 10a and FS discharge port 10b may be provided in wall members 13 and 14.

The plurality of hollow fiber membranes are preferably a hollow fiber membrane wound body formed by helically winding hollow fiber membranes or a bundle of hollow fiber membranes around the porous distribution tube and thereby radially stacking the hollow fiber membranes. In the hollow fiber membrane wound body, the hollow fiber membranes may be arranged so as to cross each other. Generally, by adopting crossing arrangement, voids are regularly formed at crossed portions of the hollow fiber membranes. Due to these regular voids, an insoluble component, a particle component, or the like in the fluid flowing through the outside of the hollow fiber membranes is less likely to be caught between the hollow fiber membranes, and an increase in pressure loss is less likely to be caused.

The hollow fiber membrane wound body can be manufactured by a conventionally known method. As described for example in Japanese Patent Nos. 4412486, 4277147, 3591618, and 3008886, 45 to 90 or more hollow fiber membranes are aggregated to obtain a single hollow fiber membrane aggregate, a plurality of such hollow fiber membrane aggregates are laterally aligned to obtain a flat hollow fiber membrane bundle, and the hollow fiber membrane bundle is traversely wound around a porous distribution tube having a large number of pores. On this occasion, the hollow fiber membrane bundle is wound so as to form crossed portions at specific positions in a circumferential surface of a wound body, by adjusting the length and rotational speed of the porous distribution tube as well as the traverse speed of the hollow fiber membrane bundle.

In addition, the hollow fiber membrane element can be manufactured, for example, by sealing both ends of the hollow fiber membranes and the porous distribution tube with a resin, and then partially cutting the resin to open both end portions of the hollow fiber membranes. For example, the hollow fiber membrane wound body described above is adjusted in terms of length and positions of the crossed portions, and is cut at a predetermined position. Both end portions of the wound body are bonded, and then both sides of the wound body are cut. Thereby, a hollow fiber membrane element having openings at both ends of hollow fiber membranes can be fabricated.

Examples of a semipermeable membrane constituting the hollow fiber membranes include semipermeable membranes called a reverse osmosis membrane (RO membrane), a forward osmosis membrane (FO membrane), a nanofiltration membrane (NF membrane), and an ultrafiltration membrane (UF membrane). The semipermeable membrane is preferably a reverse osmosis membrane or a forward osmosis membrane or a nanofiltration membrane. It should be noted that, when a reverse osmosis membrane or a forward osmosis membrane or a nanofiltration membrane is used as the semipermeable membrane, object solutions preferably have a pressure of 0.5 to 10.0 MPa.

Generally, the RO membrane and the FO membrane have a pore diameter of about 2 nm or less, and the UF membrane has a pore diameter of about 2 to 100 nm. The NF membrane is a type of RO membrane having a relatively low ratio of blocking ions and salts, and generally has a pore diameter of about 1 to 2 nm. When the RO membrane or the FO membrane or the NF membrane is used as the semipermeable membrane, the RO membrane or the FO membrane or the NF membrane preferably has a salt removal ratio of 90% or more.

The material constituting the semipermeable membrane is not particularly limited, and examples thereof include a cellulose-based resin, a polysulfone-based resin, and a polyamide-based resin. The semipermable membrane is preferably composed of a material including at least one of a cellulose-based resin and a polysulfone-based resin.

The cellulose-based resin is preferably a cellulose acetate-based resin. The cellulose acetate-based resin is resistant to chlorine serving as a germicide, and has a characteristic that it can suppress growth of microorganisms. The cellulose acetate-based resin is preferably celluose acetate, and is more preferably cellulose triacetate in view of durability.

The polysulfone-based resin is preferably a polyethersulfone-based resin. The polyethersulfone-based resin is preferably sulfonated polyethersulfone.

As described for example in Japanese Patent No. 3591618, a solution for membrane production containing cellulose triacetate, ethylene glycol (EG), and N-methyl-2-pyrrolidone (NMP) is discharged from a three-split nozzle, is caused to pass through an aerially travelling portion, and is immersed in a coagulation liquid containing water, EG, and NMP to obtain a hollow fiber membrane. The hollow fiber membrane is washed with water and is then heat treated. Thereby, a cellulose acetate-based hollow fiber membrane can be manufactured. Further, copolyamide obtained from terephthalic dichloride, 4.4'-diaminodiphenylsulfone, and piperazine in accordance with a low temperature solution polymerization method is purified and is then dissolved in a dimethylacetamide solution containing $CaCl_2$ and diglycerin to obtain a solution for membrane production. This solution is discharged from a three-split nozzle into a coagulation liquid through an aerially travelling portion to obtain a hollow fiber membrane. The hollow fiber membrane is washed with water and is then heat treated. Thereby, a polyamide-based hollow fiber membrane can be manufactured.

The outer diameter of the hollow fiber membrane is not particularly limited as long as the membrane is used for osmosis treatment and the like, and is 160 to 320 μm, for example. If the outer diameter is less than this range, the inner diameter also becomes smaller inevitably, and thus a fluid flowing through a hollow portion of the hollow fiber membrane has a large flow pressure loss, which may cause a problem. In contrast, if the outer diameter exceeds this range, a membrane area per unit volume in the module cannot be increased to fail to achieve compactness as one of advantages of the hollow fiber membrane module.

The hollowness of the hollow fiber membrane is not particularly limited as long as the membrane is used for osmosis treatment and the like, and is 15 to 45%, for example. If the hollowness is less than this range, the hollow portion has a large flow pressure loss to possibly fail to achieve a desired water permeability. In contrast, if the hollowness exceeds this range, the hollow fiber membrane may fail to secure sufficient pressure resistance during osmosis treatment. It should be noted that the hollowness (%) can be obtained by the following equation:

$$\text{hollowness (\%)} = (\text{inner diameter/outer diameter})^2 \times 100.$$

It should be noted that the hollow fiber membrane element in the present embodiment can achieve a larger membrane area per element, as compared with a spiral-type flat membrane element. Though depending on the size of hollow fiber membranes, the hollow fiber membrane element can obtain a membrane area about ten times that of a spiral-type flat membrane element substantially equal in size. Therefore, the hollow fiber membranes have an extremely small treatment amount per unit membrane area when obtaining the same water permeability, and can reduce dirt on membrane surfaces produced when supply water permeates the membranes, as compared with spiral-type flat membranes. Thus, a long operation time can be obtained before washing of the membranes. Further, since an uneven flow is less likely to be caused within the hollow fiber membrane element, the hollow fiber membrane element is advantageous in that it can improve permeation efficiency.

The hollow fiber membrane module in the present embodiment is not particularly limited, and can be used for water treatment (membrane separation treatment) such as forward osmosis treatment and reverse osmosis treatment. The hollow fiber membrane module in the present embodiment is preferably a module for isotonic solution-pressurized membrane separation (brine concentration), and can be suitably used, for example, for a large-sized plant for isotonic solution-pressurized membrane separation, and the like.

An isotonic solution-pressurized membrane separation method is a method of flowing object solutions having the same concentration (solutions having the same osmotic pressure) on both sides of a separation membrane, pressurizing the object solution (FS) on one side of the separation membrane to cause water in the object solution (FS) on the one side of the separation membrane to permeate the separation membrane toward the object solution (DS) on the other side of the separation membrane, and thereby concentrating the object solution (FS) on the one side of the separation membrane. With this method, even when the object solutions (FS. DS) have a higher concentration, basically there arises no difference in osmotic pressure between the both sides of the separation membrane. Thus, concentration can proceed at low pressure, and membrane separation can be performed on the object solutions having a higher concentration, with low energy.

It should be noted that, although the present embodiment has described a configuration that the FS is supplied from a supply port in communication with the outside of the hollow fiber membranes (FS supply port 10a) and is discharged from a discharge port in communication with the outside of the hollow fiber membranes (FS discharge port 10b), and the DS is supplied from a supply port in communication with the inside of the hollow fiber membranes (DS supply port 11a) and is discharged from a discharge port in communication with the inside of the hollow fiber membranes (DS discharge port 11b), the present invention is not limited thereto. That is, the scope of the present invention also includes a reverse configuration that the DS is supplied from a supply port in communication with the outside of the hollow fiber membranes (DS supply port 10a) and is discharged from a discharge port in communication with the outside of the hollow fiber membranes (DS discharge port 10b), and the FS is supplied from a supply port in communication with the inside of the hollow fiber membranes (FS supply port 11a) and is discharged from a discharge port in communication with the inside of the hollow fiber membranes (FS discharge port 11b).

Second Embodiment

Figure 3:
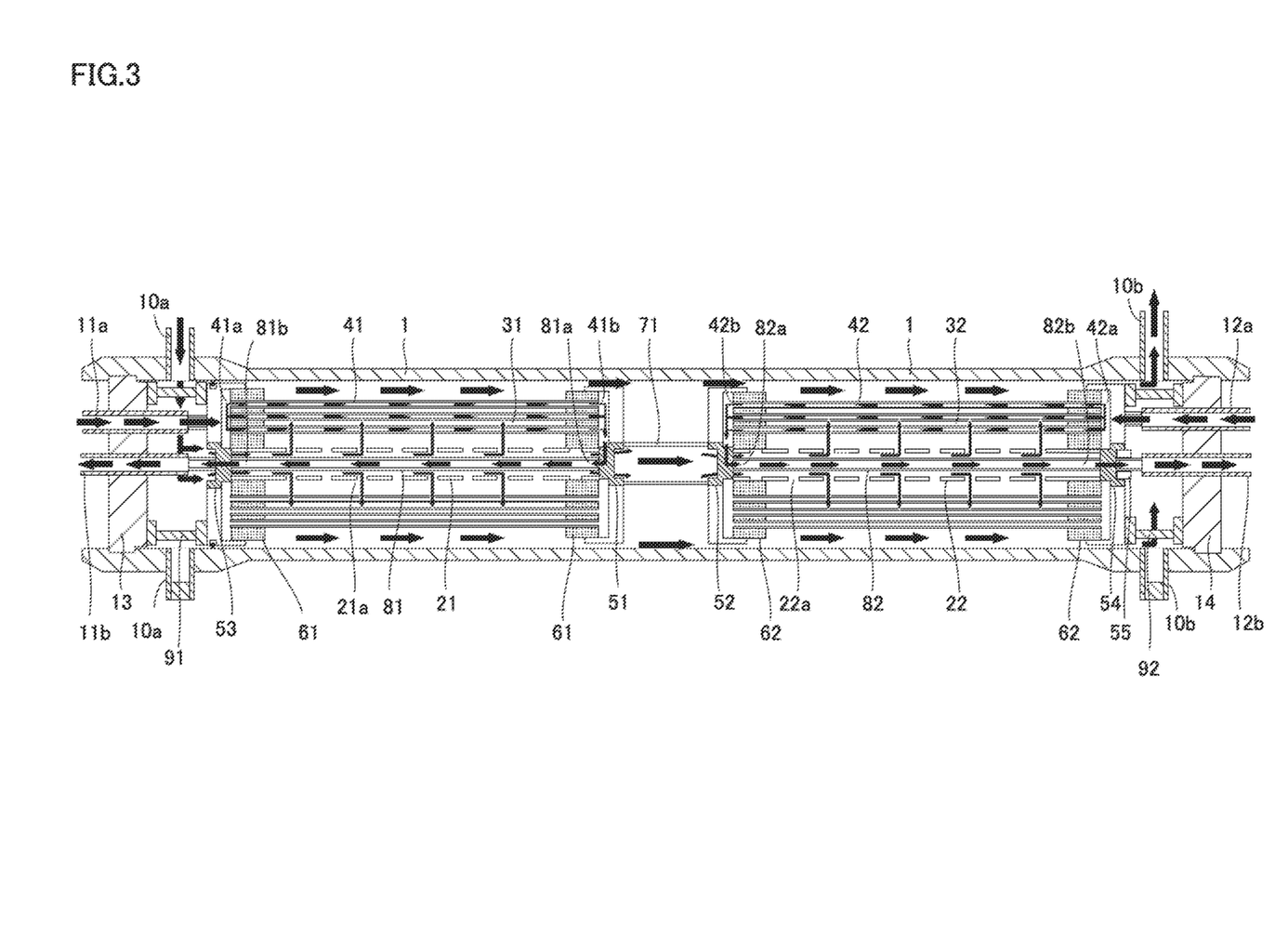
FIG. 3 is a schematic cross sectional view showing an example of a hollow fiber membrane module in a second embodiment.

Referring to FIG. 3, a hollow fiber membrane module in the present embodiment is different from the hollow fiber membrane module in the first embodiment mainly in that it is a double element-type hollow fiber membrane module including two hollow fiber membrane elements (a first hollow fiber membrane element and a second hollow fiber membrane element) loaded in series in one pressure vessel 1.

When a hollow fiber membrane module arrangement group is used as a large-sized plant, the number of hollow fiber membrane modules increases, and required tubes become complicated, causing an increase in the footprint of the hollow fiber membrane modules. Thus, it is desired to make the entire plant more compact and improve its efficiency.

As one of methods of making the plant more compact, there is conceivable a method of increasing the length of one hollow fiber membrane element to increase the ratio of hollow fiber membranes per hollow fiber membrane module and increase the membrane area per module. However, since a liquid flowing through the inside of the hollow portions of the hollow fiber membranes flows through the entire length from one end portions to the other end portions of the hollow portions, pressure loss within the hollow portions increases when the hollow fiber membranes have a long length.

Accordingly, it has been considered to use a so-called double element-type hollow fiber membrane module including two hollow fiber membrane elements loaded in series in one pressure vessel (for example, PTL 1: WO20041069391, PTL 2: Japanese Patent Laying-Open No. 2015-160157). In the double element-type hollow fiber membrane module, the volume of the pressure vessel per hollow fiber membrane element decreases, and less tubes are required to connect the hollow fiber membrane modules, as compared with a so-called single element-type hollow fiber membrane module including one hollow fiber membrane element loaded in one pressure vessel. Thus, the double element-type hollow fiber membrane module has an advantage that it can make a treatment plant more compact.

In the following, the hollow fiber membrane module in the present embodiment will be specifically described with reference to the drawings. It should be noted that the description overlapping with that in the first embodiment will be omitted here.

In the present embodiment, the first hollow fiber membrane element includes porous distribution tube 21 having the plurality of pores 21a and arranged at the center, the plurality of hollow fiber membranes 41 arranged around porous distribution tube 21, and resin walls 61 fixing porous distribution tube 21 and the plurality of hollow fiber membranes 41 at both ends thereof. It should be noted that each of the plurality of hollow fiber membranes 41 has openings at both ends thereof.

Similarly, the second hollow fiber membrane element includes a porous distribution tube 22 having a plurality of pores 22a and arranged at the center, a plurality of hollow fiber membranes 42 arranged around porous distribution tube 22, and resin walls 62 fixing porous distribution tube 22 and the plurality of hollow fiber membranes 42 at both ends thereof. It should be noted that each of the plurality of hollow fiber membranes 42 has openings at both ends thereof.

In the present embodiment, in each hollow fiber membrane element, the openings of the hollow fiber membranes are connected to independent supply port and discharge port corresponding to each hollow fiber membrane element. That is, each hollow fiber membrane element has DS supply port 11a or 12a and DS discharge port 11b or 12b which are in communication with both the inside of the plurality of hollow fiber membranes 41 or 42 and the outside of the hollow fiber membrane module. Inflow-side openings 41a and 42a of hollow fiber membranes 41 and 42 are connected to DS supply ports 11a and 12a, respectively, and outflow-side openings 41b and 42b of hollow fiber membranes 41 and 42 are connected to DS discharge ports 11b and 12b, respectively.

Bypass tube 81 or 82 is a tube provided within each hollow fiber membrane element in a longitudinal direction thereof, has bypass tube inflow port 81a or 82a at an end portion on the side of outflow-side openings 41b or 42b of the hollow fiber membranes, and has bypass tube outflow port 81b or 82b at an end portion on the side of inflow-side openings 41a or 42a of the hollow fiber membranes. Bypass tube inflow ports 81a and 82a are in communication with inner flow channels 51a and 52a (see FIG. 5) of distributors 51 and 52, respectively, and bypass tube outflow ports 81b and 82b are in communication with inner flow channels 53a and 54a (see FIG. 6) of distributors 53 and 54, respectively. It should be noted that a flow channel 54c of distributor 54 is sealed by plug 55 to prevent a liquid from passing therethrough.

An intermediate connector 71 is a member that connects the two hollow fiber membrane elements within the hollow fiber membrane module. In the present embodiment, intermediate connector 71 has a flow channel for establishing communication between a flow channel passing between porous distribution tube 21 and bypass tubes 81 in the first hollow fiber membrane element and a flow channel passing between porous distribution tube 22 and bypass tube 82 in the second hollow fiber membrane element.

It should be noted that thrust pipe 91 (see FIG. 7) is placed between the first hollow fiber membrane element and wall member 13, and a thrust pipe 92 (see FIG. 7) is placed between the second hollow fiber membrane element and wall member 14.

Referring to FIG. 3, the DS supplied from DS supply ports 11a and 12a flows from inflow-side openings 41a and 42a of hollow fiber membranes 41 and 42 within the hollow fiber membrane elements into the inside of hollow fiber membranes 41 and 42, and flows out from outflow-side openings 41b and 42b on the other end side, respectively. The flowing-out DS flows from flow channels 51b and 52b of distributors 51 and 52, passes through flow channels 51a and 52a (see FIG. 5), and flows from bypass tube inflow ports 81a and 82a of bypass tubes 81 and 82 into the inside of the bypass tubes, respectively. Then, the DS passes through inner flow channels 53a and 54a (see FIG. 6) of distributors 53 and 54 connected to bypass tube outflow ports 81b and 82b, and is taken out from DS discharge ports 11b and 12b to the outside.

The FS flows from FS supply port 10a, passes through outer flow channel 53c (see FIG. 6) of distributor 53, and enters a gap between porous distribution tube 21 and bypass tube 81 in the first hollow fiber membrane element. A portion of the FS flows out from pores 21a, and is supplied to outside 31 of hollow fiber membranes 41. A remaining portion of the FS passes through outer flow channel 51c (see FIG. 5) of distributor 51, passes through intermediate connector 71, passes through an outer flow channel 52c (see FIG. 5) of distributor 52, enters a gap between porous distribution tube 22 and bypass tube 82 in the second hollow fiber membrane element, flows out from pores 22a, and is supplied to an outside 32 of hollow fiber membranes 42. The FS passing through outside 31 of hollow fiber membranes 41 in the first hollow fiber membrane element joins the FS passing through outside 32 of hollow fiber membranes 42 in the second hollow fiber membrane element, and is taken out from FS discharge port 10b.

Also in the second embodiment, as in the first embodiment, both DS supply port 11a and DS discharge pot 11b are provided on one end side in a longitudinal direction of the first hollow fiber membrane element (on a side opposite to the second hollow fiber membrane element), both DS supply port 12a and DS discharge port 12b are provided on one end side in a longitudinal direction of the second hollow fiber membrane element (on a side opposite to the first hollow fiber membrane element), and the supply ports and the discharge ports are in communication with the outside of the double element-type hollow fiber membrane module. Thus, for example in the case of performing a work such as loading or replacement of one hollow fiber membrane element, it is only necessary to perform the work on one end side in a longitudinal direction of the hollow fiber membrane module (i.e., on one side of a rack in which a hollow fiber membrane module arrangement group is mounted), and thereby work efficiency can be improved.

Further, according to the second embodiment, since the DS passing through each hollow fiber membrane element is independently discharged from DS discharge port 11b or 12b, the performance of the two hollow fiber membrane elements can be evaluated individually. Thereby, each hollow fiber membrane element can be replaced based on individual determination of the time for replacing the hollow fiber membrane element, and thus cost reduction and improved work efficiency can be achieved.

In addition, a conventional double element-type hollow fiber membrane module (see, for example, Japanese Patent Laying-Open No. 2015-160157) has a problem that, when a DS flowing in from one DS supply port flows into two hollow fiber membrane elements, it is difficult to supply an equal amount of the DS to a first hollow fiber membrane element and a second hollow fiber membrane element. According to the present invention, the DS is independently supplied to the two hollow fiber membrane elements, and thus it is easy to supply an equal amount of the DS to the first hollow fiber membrane element and the second hollow fiber membrane element. Hence, each element can efficiently exhibit its performance.

Figure 4:
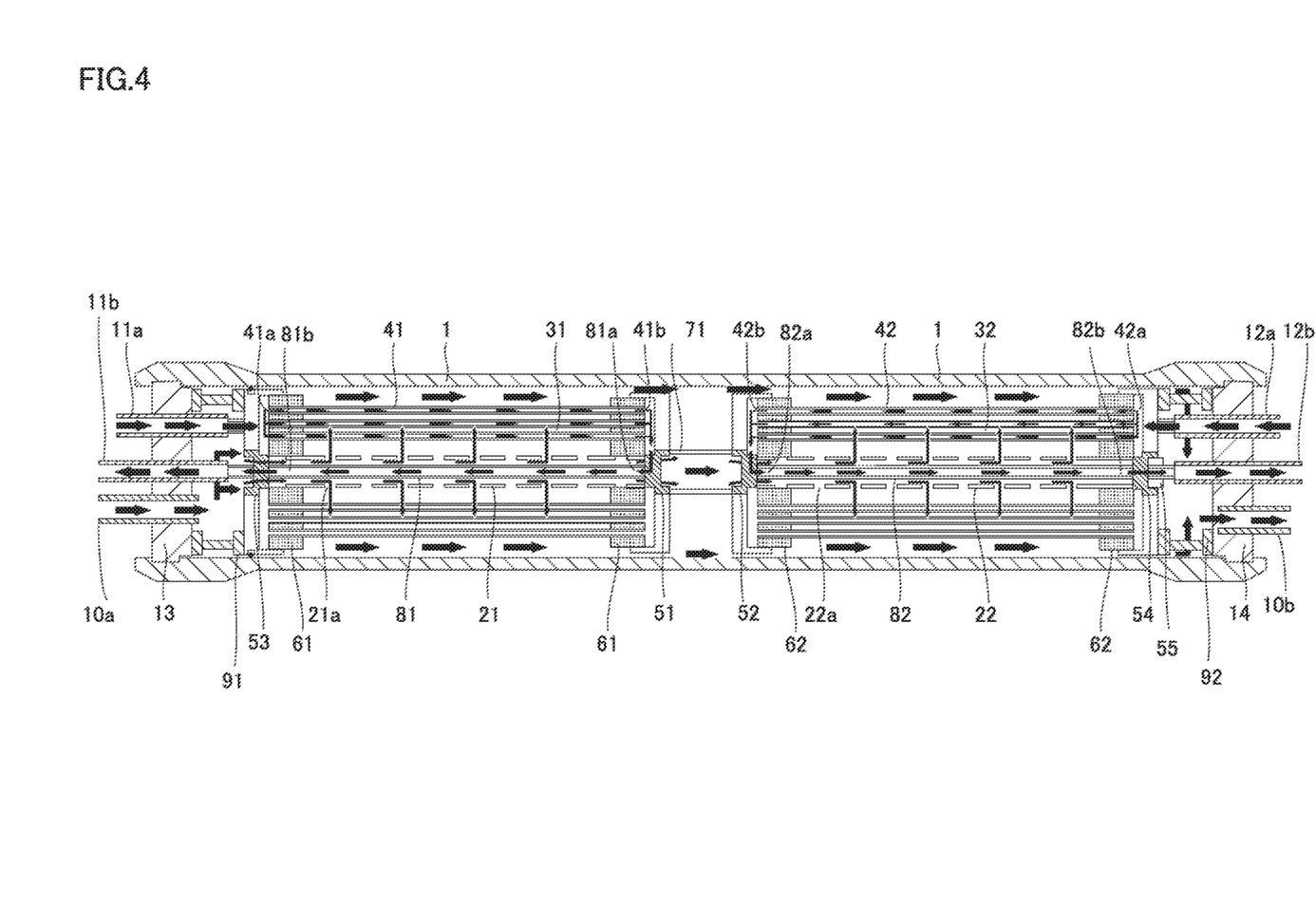
FIG. 4 is a schematic cross sectional view showing a variation of the hollow fiber membrane module in the second embodiment.

It should be noted that, although (a lower) one of FS supply ports 10$a$ and (a lower) one of FS discharge ports 10$b$ are closed in FIG. 3, these ports may be opened when a plurality of hollow fiber membrane modules are connected. In addition, although FS supply ports 10$a$ and FS discharge ports 10$b$ are provided in the outer circumferential portion of pressure vessel 1 in FIG. 3, they are not limited to such a configuration, and their configuration can be changed as appropriate. For example, as shown in FIG. 4, FS supply port 10$a$ and FS discharge port 10$b$ may be provided in wall members 13 and 14.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

INDUSTRIAL APPLICABILITY

The hollow fiber membrane module of the present invention is extremely useful in the fields of water treatment and energy generation using a concentration difference as a drive force. Specifically, the hollow fiber membrane module is applicable to concentration and recovery of organic matter, volume reduction by concentration of waste water, desalination of seawater, and the like, using a brine concentration method or the like. Further, water treatment by the membrane separation method using the hollow fiber membrane module of the present invention is energy saving, because it does not involve a phase change, as compared with a conventional separation technique such as distillation. In addition, since such water treatment does not involve a change in the state of a substance, it is also applicable in the food field such as concentration of fruit juice and separation of beer yeast, or to separation and concentration of a liquid mixture such as recovery of organic matter from industrial waste water, or the like.

REFERENCE SIGNS LIST

1: pressure vessel; 10$a$: FS supply port; 10$b$: FS discharge port; 11$a$, 12$a$: DS supply port; 11$b$, 12$b$: DS discharge port; 13, 14: wall member; 21, 22: porous distribution tube; 21$a$, 22$a$: pore; 31, 32: outside of hollow fiber membranes; 41, 42: hollow fiber membrane; 41$a$, 42$a$: inflow-side opening; 41$b$, 42$b$: outflow-side opening; 51, 52, 53, 54: distributor; 51$a$, 51$b$, 51$c$, 52$a$, 52$b$, 52$c$, 53$a$, 53$c$, 54$a$, 54$c$: flow channel; 55: plug; 61, 62: resin wall; 71: intermediate connector; 81, 82: bypass tube; 81$a$, 82$a$: bypass tube inflow port; 81$b$, 82$b$: bypass tube outflow port; 91, 92: thrust pipe; 91$a$: disk-shaped member; 91$b$: opening.

The invention claimed is:

1. A hollow fiber membrane module comprising:
one pressure vessel; and
at least one hollow fiber membrane element loaded in the pressure vessel,
each of the at least one hollow fiber membrane element including a plurality of hollow fiber membranes each having openings at both ends, a bypass tube, and a first supply port and a first discharge port provided on one end side in a longitudinal direction,
the first supply port being in communication with inflow-side openings of the plurality of hollow fiber membranes,
the bypass tube being provided in the longitudinal direction of each of the at least one hollow fiber membrane element, having a bypass tube inflow port at an end portion on a side of outflow-side openings of the hollow fiber membranes, and having a bypass tube outflow port at an end portion on a side of the inflow-side openings of the hollow fiber membranes,
the outflow-side openings of the plurality of hollow fiber membranes being in communication with the bypass tube inflow port, and the bypass tube outflow port being in communication with the first discharge port, wherein
the hollow fiber membrane module further comprises a second supply port and a second discharge port, a solution supplied from the first supply port and a solution supplied from the second supply port flow at an opposite side of the hollow fiber membranes.

2. The hollow fiber membrane module according to claim 1, wherein
the at least one hollow fiber membrane element is two hollow fiber membrane elements, and
in each of the two hollow fiber membrane elements, the first supply port and the first discharge port are provided on a side opposite to the other hollow fiber membrane element.

3. The hollow fiber membrane module according to claim 1, wherein the hollow fiber membrane module is for isotonic solution-pressurized membrane separation.

4. The hollow fiber membrane module according to claim 1, wherein the at least one hollow fiber membrane element includes a hollow fiber membrane wound body having the plurality of hollow fiber membranes helically wound around a central axis.

5. The hollow fiber membrane module according to claim 1, wherein
each of the at least one hollow fiber membrane element further includes a porous distribution tube which distributes the solution to an outside of the hollow fiber membranes, and
the bypass tube is placed inside the porous distribution tube.

* * * * *